United States Patent [19]

Garcia

[11] 3,964,739
[45] June 22, 1976

[54] SELF-ALIGNING AND SELF-LEVELING PINCH ROLL FOR MAGNETIC CARD TRANSPORT SYSTEM

[75] Inventor: Valentine Garcia, San Jose, Calif.

[73] Assignee: Xerox Corporation, Stamford, Conn.

[22] Filed: Dec. 30, 1974

[21] Appl. No.: 537,794

[52] U.S. Cl............................... 271/3; 226/180; 226/187; 226/192; 271/250; 271/274; 271/DIG. 9
[51] Int. Cl.².............................................. B65H 5/06
[58] Field of Search ...... 271/274, 273, 272, DIG. 9, 271/251, 264, 80, 3, 250, 248; 226/177, 187, 180, 194, 191, 192, 179; 198/167

[56] References Cited
UNITED STATES PATENTS

| | | | |
|---|---|---|---|
| 2,535,234 | 12/1950 | Schwartz | 226/177 X |
| 3,402,868 | 9/1968 | Hammond | 226/187 |
| 3,438,558 | 4/1969 | Hammond | 226/194 X |
| 3,561,660 | 2/1971 | Nicol et al. | 226/187 |
| 3,704,360 | 11/1972 | McFadden | 271/DIG. 9 |

Primary Examiner—Richard A. Schacher
Assistant Examiner—Bruce H. Stoner, Jr.
Attorney, Agent, or Firm—Sheldon F. Raizes

[57] ABSTRACT

A magnetic card transport system for an electronic typewriter comprises a reversible drive roller and a coacting pinch roller which form a nip through which a magnetic card is passed. The drive roll and pinch coact to move the card in opposite directions. A guide surface is provided which is engaged by one longitudinal edge of the card, and guide springs are provided which engage the other longitudinal edge of the card to urge the card into engagement with the guide surface for registration purposes. The pinch roll is mounted in such a manner that it may freely oscillate. The oscillation is such that the pinch roll axis pivots in each direction from a line substantially perpendicular to the guide surface between ½° and 3° about a vertical axis normal to its axis of rotation to allow for self-alignment to maintain the card in alignment with the guide surface. With this construction, manufacturing tolerances of the pinch roll assembly for alignment are not as critical when the roller is not free to rotate about a vertical axis to self-align. The pinch roll is so mounted that it may also rock and be self-leveling to permit the full width thereof to engage the card.

6 Claims, 5 Drawing Figures

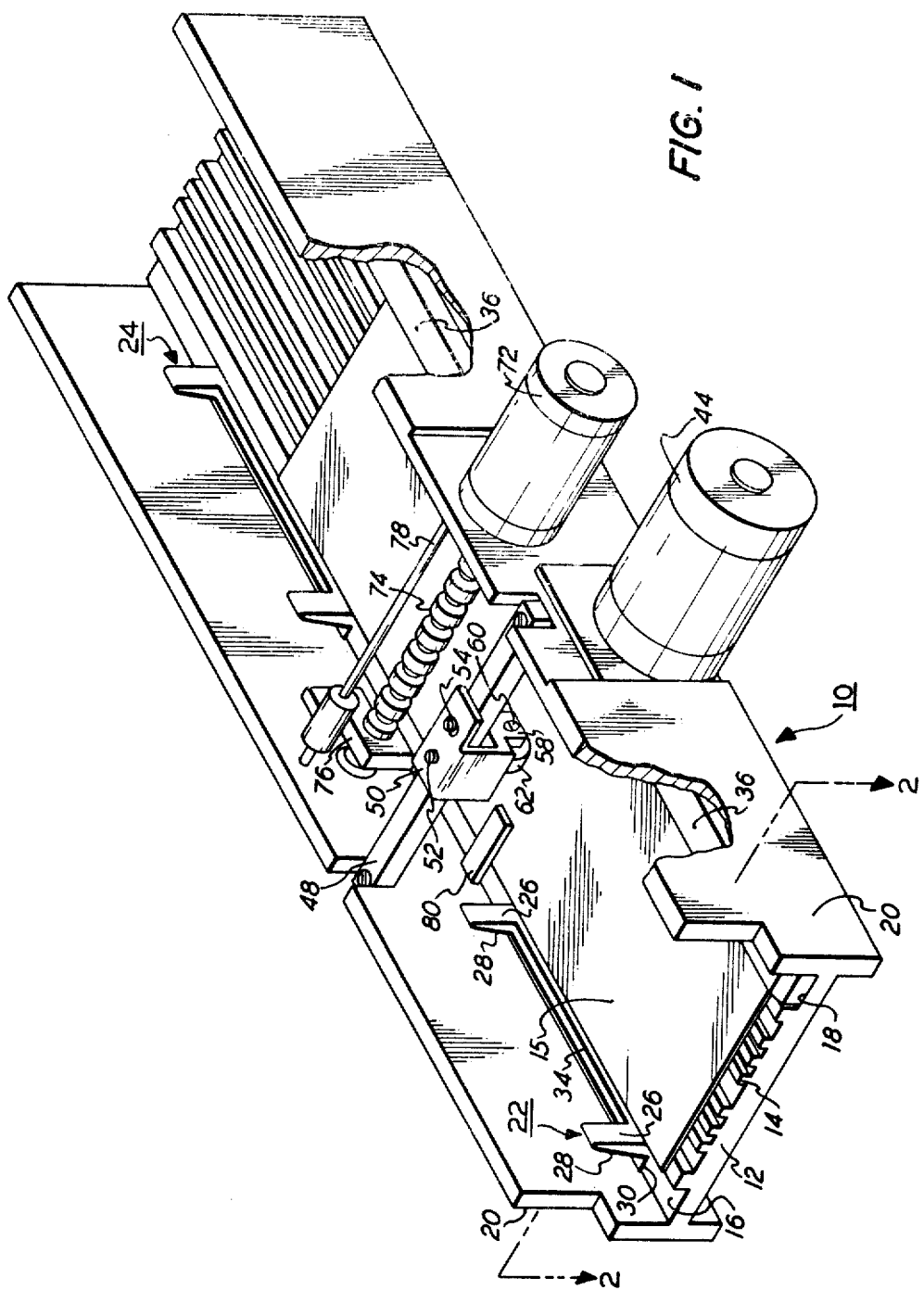

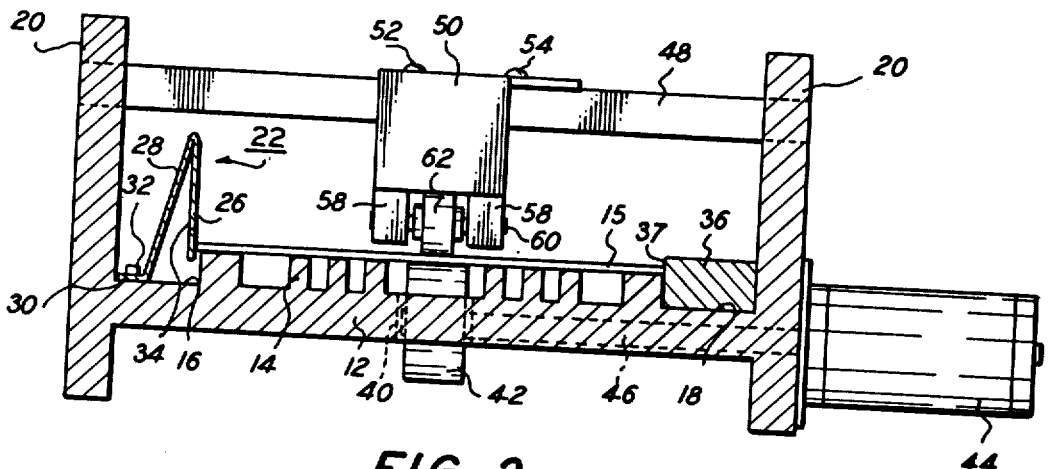

SELF-ALIGNING AND SELF-LEVELING PINCH ROLL FOR MAGNETIC CARD TRANSPORT SYSTEM

DESCRIPTION OF THE INVENTION

This application is related to copending U.S. application Ser. No. 512,578, filed Oct. 7, 1974; U.S. Pat. application Ser. No. 512,581, filed Oct. 7, 1974; and U.S. Pat. application Ser. No. 522,662, filed Nov. 11, 1974, now U.S. Pat. No. 3,915,449 each of which is commonly assigned.

This invention concerns a magnetic card transport subsystem for an electronic typewriter.

It is an object of this invention to provide a simple and efficient card transport system. It is proposed to achieve this object by providing a drive roll and pinch roll which coact to alternately drive a magnetic card in a forward direction past a magnetic head for a read or write function and then in the opposite return direction while the magnetic head changes tracks to perform the read or write function when the magnetic card makes its next forward pass.

It is a further object of this invention to provide a self-aligning pinch roll which allows the same pinch roll and drive roll to alternately move the magnetic card in opposite directions while maintaining the card in registered alignment during such movement.

In card transport systems, quite often only a portion of the width of a pinch roll engages a magnetic card to apply pressure thereto to urge the same against the drive roll resulting in too much pressure being concentrated on the magnetic card surface engaged by the pinch roll. Ordinarily, information is placed on the surface engaged by the pinch roll during a writing function or the surface already contains information during a reading function. The pinch roll engages the same surface area for as many times as there are tracks when the same pinch roll is used for driving the magnetic card in only one direction or engages the same surface area for twice as many times as there are tracks when the same pinch roll is used for driving the magnetic card in opposite directions. This excess pressure can cause damage to the surface resulting in problems in writing information onto the surface or reading the information already on the surface.

Accordingly, it is another object of this invention to provide such a card transport subsystem with a pinch roll which can shift or rock about an axis which is normal to its axis of rotation to automatically adjust to the plane of the card to enable the entire width of the pinch roll to contact the card and thus avoid excess pressure being exerted on the card by the pinch roll.

Other objects of this invention will become apparent from the following description with reference to the drawings wherein:

FIG. 1 is a perspective view of a card transport system;

FIG. 2 is a view taken along section line 2—2 of FIG. 1;

FIG. 3 is a plan view of a support bracket for a pinch roll;

FIG. 4 is a section view of a pinch roll support shown in FIG. 1; and

FIG. 5 is a view of a pinch roll and magnetic card wherein only a portion of the width of the pinch roll engages the card.

Referring to FIG. 1, there is illustrated a card transport subsystem of an electronic typewriter system which comprises a frame 10. The frame 10 comprises a card support platform 12 having a plurality of ribs 14 for supporting a magnetic card 15. One longitudinal edge of the platform is defined by a groove 16 and the other longitudinal edge of the platform is defined by a groove 18. Projecting above the platform 12 adjacent the grooves 16 and 18 are support walls 20. Positioned in the groove 16 are a pair of resilient leaf springs 22 and 24 each of which has two U-shaped sections 26 and 28 connected to each other at the free ends of the legs of the U. The closed end 30 of section 28 is flat and is located in the groove 16 and is secured by screws 32 to the platform 12. The closed end 34 of section 26 is flat and lies in a plane which is approximately normal to the platform with the bottom edge thereof extending below the ribs 14 into the groove 16. The spring is so constructed that section 26 is biased away from section 28.

A guide bar 36 is located in the groove 18 and secured to the platform 12. The guide bar extends substantially above the ribs 14 to provide a guide surface 37 thereabove for a longitudinal edge of the card 15. An opening 40 is provided in the platform 12 and receives a portion of a resilient drive roll 42 therein which is so located that a plane tangential to the periphery of the roll portion extending through the opening 40 will be substantially coincident with the plane of the top of the ribs 14 to prevent possible deformation of or lifting of the card 15 when the card is driven by the drive roll 42. A D.C. motor 44 is secured to one wall 20 and has a drive shaft 46 operably connected to the drive roll 42 by any well-known means to alternately drive the roll 42 in opposite directions.

A support bar 48 is secured to the walls 20 and a pinch roll support bracket 50 is secured to the bar 48 by a pair of screws 52 and 54 (see FIG. 3). Screw 52 extends through an opening in the bracket which is approximately the same diameter as the screw and screw 54 extends through an oversized opening 56 which allows the bracket 50 to be adjusted by pivoting about screw 52 when both screws 52 and 54 are loosened. The bracket 50 includes a pair of roll supporting legs 58. A shaft 60 extends through a pinch roll 62 and each end thereof is located in an elongated cavity 64 in each leg 58. The portion of the shaft 60 extending into the cavities 64 have a flat surface 66 and the upper portion of each cavity has a counterbore 68. A coil spring 70 is located in each cavity and has one end resting on the flat 66 and the other end thereof positioned in the counterbore 68. In this position, the coil spring is in compression and urges the shaft 60 against the bottom of the cavity 64. The pinch roll 62 freely rotates about the shaft 60. The width W of the cavity is larger than corresponding dimension $d$ of the shaft by an amount which allows for slight pivoting of the shaft 60 and thereby the roller about a vertical axis normal to the shaft of a magnitude of 1° to 6° for a purpose to be described later. For instance, the width W of the cavity may be 0.102 inch while the dimension $d$ of the shaft may be 0.092 inch.

The bar is located on the walls 20 in such a manner that the periphery of the pinch roll 62 will be spaced from the drive roll 42 by less than the thickness of the card 15 when the shaft 60 is pressed against the bottom of the cavities 64 by the springs 70. For instance, the spacing may be on the order of 0.003 inch while the thickness of the card is 0.008 inch. This is to prevent contact between the two rolls when the machine is not in use to avoid producing depressions in the resilient drive roll 42 since any depression in the drive roll will cause a jerky motion affecting reading the card or writing on the card or subsequent correlation of the two functions.

The axial width of the pinch wheel 62 at its axis of rotation is smaller than the space between the legs 58 by an amount sufficient to permit the wheel to visually shift from side to side upon change in direction of rotation when the pinch roll is out of alignment. For instance, the width of the pinch roll at its axis of rotation can be 0.250 inch while the space between the legs can be 0.312 inch thereby allowing shifting of 0.062 inch. This feature is built into this mechanism to allow one to adjust the pinch roll to align the same with the guide surface so it has the ability to effect, by pivoting a resultant driving force vector of the drive roll and pinch roll in a direction, which is substantially parallel to the guide surface 37. To effect such alignment of the pinch roll 62 with the guide surface, a card is moved in reverse directions between the pinch roll 62 and drive roll 42 by reversing rotation of the rolls. When the pinch roll is out of alignment, the pinch roll 62 will shift axially upon each reversal of rotation. The person adjusting the pinch roll position observes this and adjusts the position of the pinch roll until such shifting stops which indicates the freely pivoting pinch roll is in alignment. When positioned in alignment, the pinch roll will be free to oscillate such that the axis thereof pivots between about ½° to 3° in each direction from a line which is substantially perpendicular to the guide surface 37. Adjustment is effected by pivoting the bracket 50 about pivot screw 52 and then tightening screw 54 to lock the bracket in place. In this case, the manufacturing tolerances of various elements of the transport system are of such nature that permitting the pinch roll to freely rotate about a vertical axis between about 1° to 6°, the pinch roll will automatically compensate for any misalignment due to such tolerances so the resultant driving force vector of the drive roll and pinch roll will be substantially parallel to the guide surface 37.

The significance of allowing the pinch roll 62 to freely rotate such that the axis thereof pivots at least ½° in either direction from a line substantially perpendicular to the guide surface 37 can be seen when comparing the same to a fixed pinch roll, the axis of which is in a position not perpendicular to the guide rail by a slight rotation in a counterclockwise direction (FIG. 1). During forward movement of the card, the driving force vector between the drive roll and pinch roll will drive the card in a skewed direction away from the guide rail 36 toward the spring 24. When the card moves in the reverse direction, the force vector between the pinch roll and drive roll is toward the guide rail which does not cause the above problem. If the fixed pinch roll is in a position out of line with the guide rail by a slight rotation in a clockwise direction (FIG. 1), then the same problem occurs in the card reverse movement rather than in the card forward movement. Thus, with a roller fixed against free angular alignment, manufacturing tolerances must be very tight or the above problem will occur when the same drive roller and pinch roll are used for moving a card in reverse directions. These tight tolerances may in some instances be impractical to hold. One obvious alternative method to overcome the above problem would be to design the spring 24 to have a force to overcome the continuous frictional contact between the card and pinch roll 62 to continuously keep the card against the guide rail. However, this will create a higher frictional contact against the guide rail increasing the resistance to forward movement of the card. To overcome this resistance, a stronger motor is needed to drive roll 42 which increases the skew driving force. Thus, this becomes quite a design problem which is eliminated by allowing the pinch roll to freely rotate such that the axis thereof pivots about a vertical axis at least 1/2° in either direction from a line substantially perpendicular to the guide surface 37 so the resultant driving force vector between the pinch roll and drive roll is substantially parallel to the guide surface 37. The pivoting movement of the pinch roll is limited such that the axis thereof pivots not more than about 3° in each direction from a line which is substantially perpendicular to the guide surface 37 since any movement greater than that angle tends to skew the pinch roll too much in one direction. Too much skew decreases the possibility that the pinch roll can change angles on the reverse movement of the card and that the card will move in the reverse direction thus reducing the reliability of the system.

As can be seen from FIG. 4, the vertical dimension of the cavity 64 is substantially larger than the corresponding vertical dimension of the shaft 60 allowing for vertical movement of the shaft 60 and thereby the pinch roll 62 relative to the legs 58. Since the ends of the shaft are spring biased, each end may move upwards independent of each other allowing the pinch roll to rock or shift about an axis transverse to the shaft 60 and generally parallel to the card 15 to permit the peripheral surface of the pinch roll to align with the surface of the card to fully contact the same across its axial width. This is most desirable since the pinch roll contacts the surface upon which information is to be stored or is stored and any excess concentration of pressure can damage the surface. Damage can occur when the pinch roll surface is at an angle with the plane of the card (depicted in FIG. 5) and the load exerted by the springs onto the pinch roll is transferred to the card surface by a minor portion of the pinch roll surface.

A step motor 72 is connected to one of the walls 20 and a worm gear 74 extends therefrom across the platform and is journalled into the other wall. A magnetic head 76 is operatively secured to a guide rod 78 and to the worm gear 74 for stepped slidable movement across the platform 12. A light emitting diode (LED) detector 80 is located to detect the leading edge of the card which then actuates a control circuit. The control circuit is designed to place the magnetic head 76 and the motor 44 into a read or write condition depending upon the function selected by an operator. In the write condition, an operator types one line of information into a buffer system to store the information. When the operator hits the carriage return button, the motor 44 is actuated to rotate the drive roll 42 to drive the card 15 forwards and simultaneously bits of information are fed from the buffer to the magnetic head 76 and recorded on the card. After one line of information is recorded, the motor 44 is reversed to reverse rotation of the drive roll 42 and thereby move the card in the reverse direction while simultaneously motor 72 is actuated to move the magnetic head 76 transversely to the next track. The same procedure is followed after the operator types the next line and pushes the carriage return button. In the read condition, the motor 44 is continuously actuated to alternately move the card 15 in opposite directions. The magnetic head reads a track of bits during forward movement of the card 15 therepast and the card 15 is moved in the reverse direction while the magnetic head is moved transversely to the next track by motor 72. A sheet of paper is typed automatically in accordance with the bits of information on the card 15 during reading thereof.

In operation, the card 15 is placed onto the platform 12. As the leading edge thereof slides past the LED 80, the control circuits are readied for activation and further movement of the card brings the leading edge thereof to the nip between the rolls 42 and 62 raising the pinch roll 62 against the springs 70 to accommodate the thickness of the card. The strength of the springs 70 is such that the card is pressed against the drive roll 42 to maintain sufficient friction therebetween to drive the card. Since one end of the shaft 60 can move vertically relative to the other end, the pinch roll aligns itself for full axial contact with the card 15. When the motor 44 is activated either by depressing a carriage return button or by depressing the appropriate button for reading the card, the drive roll is rotated in a clockwise direction (FIG. 4) to drive the card forwards. The side edge of the card engages leaf spring 22 which exerts a force on the card to urge the opposite edge thereof against the guide rail 36 to maintain registration for reading and writing functions. Since the pinch roll 62 is allowed to pivot relative to its support bracket 58 such that its axis pivots at least 1/2° in each direction from a line substantially perpendicular to the guide surface 37, the card meets no resistance from the pinch roll when it is urged toward the guide rail by the spring 22. When the card is urged toward the guide rail, the card pivots the pinch roll until the resultant driving force vector between the pinch roll and drive roll is substantially parallel to the guide surface 37. As the card continues its forward movement, it moves under the magnetic head for either the printing or reading function and engages the spring 24 which in conjunction with spring 22 urges the card toward the guide rail. After the card has moved forward to receive a certain quantity of data bits from the magnetic head or a certain quantity of data bits have been read by the magnetic head, the control circuit will act to reverse the motor 44 to reverse the rotation of the drive wheel 42 and thereby move the card rearwards to its next read or write position. At the same time, step motor 72 is activated to transversely move the magnetic head 76 to the next track.

What is claimed is:

1. A card transport system comprising a card support member having a top surface, stationary guide means extending along one longitudinal edge of said support member and extending above said top surface, an opening in said member extending through said top surface, a drive roll supported for rotation about an axis which is generally parallel to said top surface and having a portion thereof extending into said opening with a plane tangent to the periphery thereof being substantially coplaner with said top surface, means for driving said roll in opposite directions, a rotatable pinch roll located above said top surface opposite said drive roll and forming a card receiving nip with said drive roll, resilient means urging said pinch roll towards said drive roll, and means loosely mounting said pinch roll for pivotal movement thereof that its axis pivots between about ½° and 3° relative to said support member in opposite directions from a line substantially perpendicular to said guide means about a vertical axis substantially normal to its axis of rotation and substantially normal to said top surface, said means loosely mounting said pinch roll comprising a stationary bracket located above said top surface and having a pair of spaced members extending toward said surface, an opening in each of said spaced members, a shaft, said pinch roll being located between said members and rotatably connected to said shaft, said shaft extending between said spaced members and having a respective portion thereof extending into a respective one of said openings, the width of said opening being of a dimension which is larger than the width of said shaft extending therein to allow relative movement therebetween to permit said pivotal movement of said pinch roll such that its axis pivots between about ½° and 3° in opposite directions from a line substantially perpendicular to said guide means about said vertical axis.

2. The structure as recited in claim 1 further comprising means for limiting movement of said pinch roll toward said drive roll so that said pinch roll is slightly spaced from said drive roll.

3. The structure as recited in claim 1 wherein bracket support means is connected to said card support member, said bracket being mounted to said bracket support means for adjustable pivotal movement about an axis which is substantially parallel to said vertical axis to adjust the position of said pinch roll, and means for securing said bracket against pivotal movement once said pinch roll is adjusted.

4. The structure as recited in claim 1 wherein said resilient means comprises a coil spring located in each said opening and compressed between a respective portion of said shaft extending into said opening and a shoulder in said opening, the length of said opening in a direction toward said top surface being of a dimension which is larger than the corresponding length of said shaft to allow relative movement therebetween to permit movement of said pinch roll about an axis which is generally parallel to said top surface and generally normal to said shaft.

5. A card transport system comprising a card support member having a top surface, stationary guide means extending along one longitudinal edge of said support member and extending above said top surface, an opening in said member extending through said top surface, a drive roll supported for rotation about an axis which is generally parallel to said top surface and having a portion thereof extending into said opening with a plane tangent to the periphery thereof being substantially coplaner with said top surface, means for driving said roll in opposite directions, a pinch roll, pinch roll support means comprising a stationary bracket located above said top surface and having a pair of spaced members extending toward said surface, an opening in each of said spaced members, a shaft, said pinch roll being located between said members and rotatably connected to said shaft, said shaft extending between said spaced members and having a respective portion thereof extending into a respective one of said openings, the length of said opening in a direction toward said top surface being of a dimension, which is larger than the corresponding length of said shaft extending therein to allow relative movement therebetween to permit said movement of said pinch roll about an axis, which is generally normal to said shaft and generally parallel to said top surface, a resilient member located in each said opening and compressed between a respective portion of said shaft extending into said opening and a shoulder in said opening, said pinch roll being located above said top surface opposite said drive roll and forming a card receiving nip with said drive roll, and resilient means urging said pinch roll towards said drive roll.

6. The structure as recited in claim 5 wherein said resilient means urging said pinch roll towards said drive roll and said resilient member located in each said opening are the same.

* * * * *